United States Patent
Ikeuchi

(10) Patent No.: US 7,532,824 B2
(45) Date of Patent: May 12, 2009

(54) DRIVING METHOD OF OPTICAL MODULATOR, AND OPTICAL TRANSMITTER AND OPTICAL TRANSMISSION SYSTEM USING SAME

(75) Inventor: Tadashi Ikeuchi, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 1147 days.

(21) Appl. No.: 10/980,776

(22) Filed: Nov. 4, 2004

(65) Prior Publication Data

US 2005/0207761 A1     Sep. 22, 2005

(30) Foreign Application Priority Data

Mar. 19, 2004  (JP) ............... 2004-080039
Aug. 31, 2004  (JP) ............... 2004-251467

(51) Int. Cl.
*H04B 10/04*     (2006.01)

(52) U.S. Cl. ............... 398/198

(58) Field of Classification Search ......... 398/182–201
See application file for complete search history.

(56) References Cited

U.S. PATENT DOCUMENTS

| 5,805,321 | A  | * | 9/1998 | Ooi et al. ............... 398/98 |
| 6,256,329 | B1 |   | 7/2001 | Ishizuka et al. |
| 6,865,348 | B2 | * | 3/2005 | Miyamoto et al. ......... 398/183 |
| 2003/0185575 | A1 | * | 10/2003 | Ikeuchi ............... 398/197 |
| 2005/0238368 | A1 | * | 10/2005 | Ikeuchi et al. ............... 398/198 |

FOREIGN PATENT DOCUMENTS

| JP | 07-084227 | 3/1995 |
| JP | 09-064920 | 3/1997 |
| JP | 11-025458 | 1/1999 |
| JP | 11-261485 | 9/1999 |
| JP | 2002-261692 | 9/2002 |

* cited by examiner

*Primary Examiner*—Quan-Zhen Wang
(74) *Attorney, Agent, or Firm*—Staas & Halsey LLP

(57) ABSTRACT

An object of the invention is to provide a driving method of an optical modulator, which enables long-distance transmission by effectively suppressing transmission waveform deterioration due to a wavelength dispersion characteristic of a transmission path, and an optical transmitter and an optical transmission system using the driving method. To this end, an optical transmitter to which the driving method of the present invention is applied, includes an optical modulator which generates an optical signal modulated in accordance with a data signal to send out the optical signal to the transmission path, and a driving apparatus therefor, and the driving apparatus comprises: a pattern detection circuit which detects a "011" and a "110" in the data signal; a 2-bit delay circuit which delays the data signal by 2 bits; a pulse width expansion circuit which expands each pulse width in a second bit in the "011" and in a second bit in the "110" in the data signal output from the 2-bit delay circuit, according to the pattern detection result of the pattern detection circuit; and a driving circuit which drives the optical modulator, in accordance with the data signal in which the pulse width is expanded.

23 Claims, 13 Drawing Sheets

FIG.23

(A)
"011" PATTERN DETECTION TABLE

| A1 | A2 | B1 | B2 | OUTPUT |
|---|---|---|---|---|
| 0 | 1 | 1 | × | H |
| × | 1 | 0 | 1 | H |
| COMBINATION OTHER THAN ABOVE | | | | L |

(B)
"110" PATTERN DETECTION TABLE

| A1 | A2 | B1 | B2 | OUTPUT |
|---|---|---|---|---|
| 1 | 0 | 1 | × | H |
| × | 1 | 1 | 0 | H |
| COMBINATION OTHER THAN ABOVE | | | | L |

DRIVING METHOD OF OPTICAL MODULATOR, AND OPTICAL TRANSMITTER AND OPTICAL TRANSMISSION SYSTEM USING SAME

BACKGROUND OF THE INVENTION

1. Field of the Invention

The present invention relates to a driving technique for an optical modulator used mainly for optical communication, and more particularly, relates to a driving method of an optical modulator, which enables long-distance transmission by suppressing transmission waveform deterioration due to a wavelength dispersion characteristic of a transmission path, and an optical transmitter and an optical transmission system using the driving method.

2. Description of the Related Art

In ultrahigh-speed and long-distance optical communications, waveform collapse of an optical signal becomes large due to a wavelength dispersion characteristic of an optical fiber. Therefore, a dispersion compensation fiber compensating for wavelength dispersion is necessary, in order to transmit the optical signal over a long distance. However, since the dispersion compensation fiber is expensive, a technique for transmitting ultrahigh-speed optical signals without dispersion compensation is required.

FIG. 24 is a diagram showing one example of an optical transmitter, to which a conventional pre-chirp technique is applied. This conventional optical transmitter sends out an optical signal pre-chirped by performing single-drive on an optical modulator formed by using, for example, a lithium niobate ($LiNbO_3$: LN) substrate (hereinafter referred to as an LN modulator), to a transmission path. The pre-chirping is a technique for suppressing transmission waveform deterioration due to wavelength dispersion and a nonlinear effect, by giving a wavelength (frequency) variation within one pulse of a transmitted light in advance (refer to right side in FIG. 24). For example, when an α parameter representing a chirped amount given to the transmitted light is negative, and an optical fiber having a positive dispersion value with respect to a wavelength of the transmitted light is used for the transmission path, a pulse waveform of the optical signal propagated through the transmission path is compressed, and waveform expansion due to the wavelength dispersion at the transmission time is suppressed due to the waveform compression effect. As a result, the optical signal can be transmitted without deterioration of the waveform up to a certain distance (for example, to about 4 km for an optical signal of 40 Gb/s). However, if the transmission distance becomes longer than the above described distance (for example, 6 km), since a phase margin is lost, the optical signal cannot be transmitted. FIG. 25 illustrates the state of transmission waveform changes. The transmission waveform in FIG. 25 is one example of when an optical signal of 40 Gb/s and having the α parameter of −0.7 is transmitted using an optical fiber having a positive wavelength dispersion value.

As a conventional technique coping with the waveform deterioration in long-distance transmission as described above, for example, a technique has been proposed in which, in an optical receiver, a received optical signal is sampled by a monitor circuit using an A/D converter or the like to detect a deterioration amount in the received waveform, and a frequency characteristic of an equalizing amplifier is optimized corresponding to the waveform deterioration amount to perform dispersion compensation, thereby improving a reception characteristic (refer to Japanese Unexamined Patent Publication No. 2002-261692). Moreover, as a conventional technique relating to waveform shaping in the optical transmitter, for example, a semiconductor laser driving circuit for compensating for an oscillation delay of a semiconductor laser is known (refer to Japanese Unexamined Patent Publication No. 11-261485). In this semiconductor laser driving circuit, the oscillation delay of the semiconductor laser is compensated for by detecting continuous "0" in a data signal to change the pulse width of a driving waveform, to realize an optical transmission waveform of a desired shape.

However, the conventional technique has problems as described below. In the conventional technique for performing the dispersion compensation by the optical receiver, when dealing with an ultrahigh-speed optical signal such as 40 Gb/s, a high-speed operation is required for the A/D converter and the like. However, realization of an electric circuit capable of performing such a high-speed operation is not easy, and in the current technology, a large-scale control circuit such as a CPU is required, thereby causing a problem in that small size and low cost cannot be easily achieved. Moreover, since the frequency characteristic of the equalizing amplifier is optimized to perform the dispersion compensation, there is a disadvantage in that the phase margin cannot be improved as in the pre-chirp technique described above.

Even if a waveform shaped optical signal is transmitted from the optical transmitter by applying the conventional technique on the optical transmitter side as described above, the waveform of the optical signal after transmission becomes a collapsed waveform due to the wavelength dispersion characteristic of the transmission path, thereby making it difficult to extend the transmission distance.

SUMMARY OF THE INVENTION

The present invention has been accomplished in view of the above problems, and it is an object of the present invention to realize a driving method of an optical modulator, which enables long-distance transmission by effectively suppressing transmission waveform deterioration due to a wavelength dispersion characteristic of a transmission path, and also to provide a low-cost optical transmitter and optical transmission system.

In order to achieve the object, in a driving method of an optical modulator according to the present invention, which generates an optical signal modulated in accordance with a data signal to send out the optical signal to a transmission path, one aspect thereof comprises the following steps of (A1) to (A3).

(A1) Detecting a "011" pattern and a "110" pattern in the data signal, and also generating a delay data signal in which the data signal is delayed by 2 bits.

(A2) Generating a pulse width expanding data signal, in which the pulse width of a "1" signal in a second bit of the "011" pattern and the pulse width of a "1" signal in a second bit of the "110" pattern in the delay data signal are expanded to be wider than the pulse width of other bits, according to the pattern detection result.

(A3) Driving the optical modulator in accordance with the pulse width expanding data signal, and sending out an optical signal to be waveform-compressed in the transmission path, to the transmission path.

Another aspect of the driving method for the optical modulator according to the present invention comprises the following steps of (B1) to (B3).

(B1) Detecting a "010" pattern in the data signal, and also generating a delay data signal in which the data signal is delayed by 2 bits.

(B2) Generating a pulse width reducing data signal, in which the pulse width of a "1" signal in a second bit of the "010" pattern in the delay data signal is reduced to be narrower than the pulse width of other bits, according to the pattern detection result.

(B3) Driving the optical modulator in accordance with the pulse width reducing data signal, and sending out an optical signal to be waveform-compressed in the transmission path, to the transmission path.

Furthermore, another aspect of a driving method of an optical modulator according to the present invention comprises the following steps of (C1) to (C3).

(C1) Detecting a "010" pattern in the data signal, and also generating a delay data signal in which the data signal is delayed by 2 bits.

(C2) Expanding a pulse width of all the "1" signals in said delay data signal by a previously set length, and then generating a pulse width reducing data signal, in which the pulse width of a "1" signal in a second bit of the "010" pattern in the delay data signal for which the pulse width is expanded, is reduced to be narrower than the pulse width of other bits, according to the pattern detection result.

(C3) Driving the optical modulator in accordance with the pulse width reducing data signal, and sending out an optical signal to be waveform-compressed in the transmission path, to the transmission path.

In the driving method for the optical modulator as described above, the data signal whose patterns are detected in (A1), (B1) or (C1) corresponds to a data pattern of the optical signal to be sent out from the optical modulator to the transmission path. For such a data signal, the "011" pattern and the "110" pattern are detected, to generate the data signal, in which the pulse width of the "1" signal in the second bit of each of the patterns is expanded, according to the result, or the "010" pattern is detected, to generate the data signal, in which the pulse width of the "1" signal in the second bit of the pattern is reduced, according to the result. By modulating the optical modulator in accordance with the data signal, a waveform of the optical signal to be sent out from the optical modulator to the transmission path is intentionally collapsed according to the data pattern, at the stage before transmission. However, since the waveform compression occurs in the optical signal being propagated through the transmission path, the optical signal after having been transmitted for a required distance, becomes such that waveform deterioration due to a wavelength dispersion characteristic of the transmission path is suppressed and the waveform thereof is shaped. As a result, an ultrahigh-speed optical signal can be transmitted for a long distance without performing wavelength dispersion compensation.

According to the driving method for the optical modulator of the present invention as described above, an ultrahigh-speed optical signal can be transmitted for a long distance, without performing the wavelength dispersion compensation by using an expensive dispersion compensation fiber or a circuit of a complicated configuration as before. By applying the driving method for the optical modulator to construct an optical transmitter or an optical transmission system, an ultra-high-speed and long-distance optical communication can be realized at a low cost.

The optical transmitter and the optical transmission system of the present invention are constructed by applying the driving method for the optical modulator as described above, and the specific contents thereof will be described in detail in embodiments described later.

Other objects, features and advantages of the present invention will become apparent from the following explanation of the embodiments, in conjunction with the appended drawings.

BRIEF DESCRIPTION OF THE DRAWING

FIG. 23 is a diagram showing one example of a table which is referred by a "011" detection circuit and a "110" detection circuit in FIG. 22.

DESCRIPTION OF THE PREFERRED EMBODIMENTS

Figure 1:
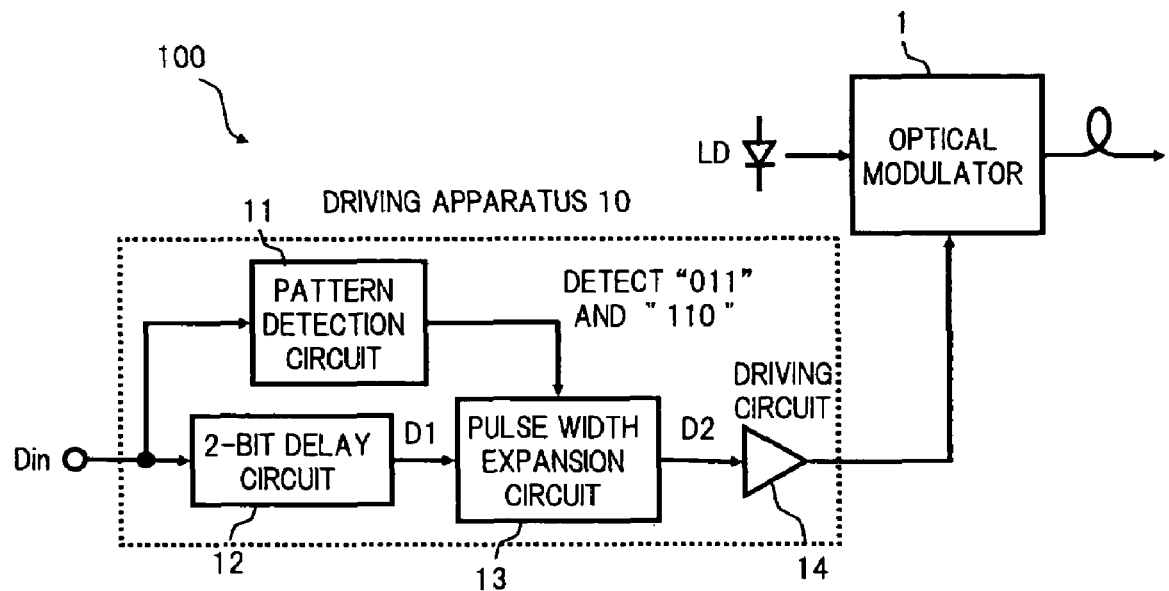
FIG. 1 is a diagram showing a configuration of an optical transmitter according to a first embodiment of the present invention.

There will be described embodiments for implementing the present invention, with reference to the accompanying drawings. The same reference numerals denote the same or equivalent parts in all drawings.

FIG. 1 is a diagram showing a configuration of a first embodiment of an optical transmitter using a driving method for an optical modulator according to the present invention.

In FIG. 1, an optical transmitter 100 in the present embodiment comprises, for example, an optical modulator 1 which generates an optical signal modulated in accordance with an externally given data signal Din to send out this optical signal to a transmission path, and a driving apparatus 10 for driving the optical modulator 1.

Figure 24:
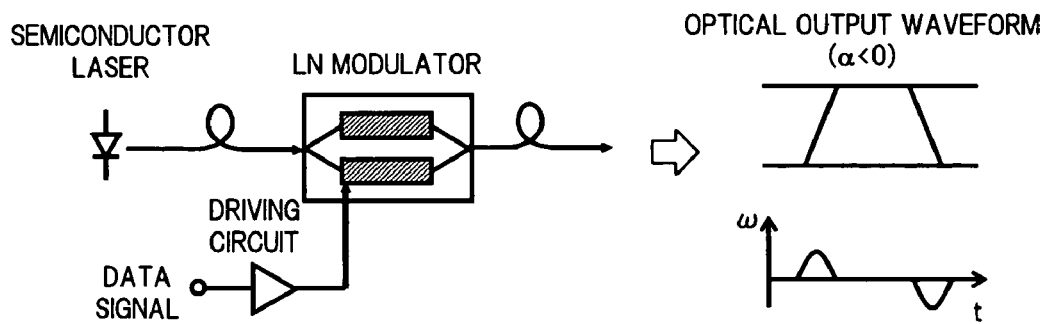
FIG. 24 is a diagram showing one example of the optical transmitter to which the pre-chirp technique in the conventional optical modulator is applied.
Figure 25:
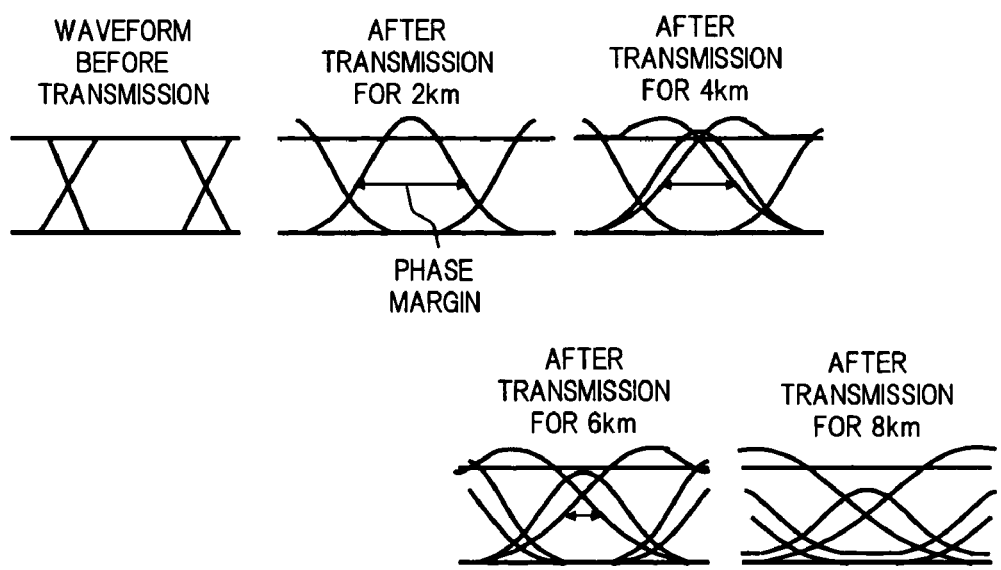
FIG. 25 is a diagram showing a state of transmission waveform deterioration in an optical signal which is subjected to the conventional pre-chirping.

The optical modulator 1 is a known optical device in which a Mach-Zehnder type waveguide and a signal electrode are formed, for example, on a Z-cut LN substrate, as in the conventional configuration as shown in FIG. 24, and a driving signal from the driving apparatus 10 is applied to the signal electrode, so that an emitted light to be provided to the Mach-Zehnder waveguide from a light source (LD) is modulated and then output. Here, one example of the Mach-Zehnder type optical modulator using the Z-cut LN substrate is shown. However, the optical modulator to which the present invention is applied is not limited to this example, and a known optical modulator capable of dealing with a desired modulation speed can be used. A modulation method by the known optical modulator may be external modulation as shown above, or may be direct modulation in which the light source is directly driven, without providing a separate modulator on the outside.

The driving apparatus 10 includes, for example, a pattern detection circuit 11, a 2-bit delay circuit 12, a pulse width expansion circuit 13 and a driving circuit 14.

The pattern detection circuit 11 detects a "011" pattern and a "110" pattern in the data signal Din input to the driving apparatus 10, to output a signal indicating the detection result to the pulse width expansion circuit 13. The data signal Din is an electric signal having a bit rate of for example 40 Gb/s or the like.

The 2-bit delay circuit 12 generates a data signal D1, in which the data signal Din is delayed by 2 bits, to output the data signal D1 to the pulse width expansion circuit 13.

When the pattern detection circuit 11 detects the respective patterns of "011" and "110", the pulse width expansion circuit 13 generates a data signal D2, in which the pulse width of a "1" signal in a second bit in each of the patterns in the data signal D1 sent from the 2-bit delay circuit 12 is made wider than those in other bits. The data signal D2 generated by the pulse width expansion circuit 13 is output to the driving circuit 14.

The driving circuit 14 generates a driving signal for allowing the optical modulator 1 to perform a modulation operation, in accordance with the data signal D2 from the pulse width expansion circuit 13, to output the driving signal to the optical modulator 1.

An operation of compensating for transmission waveform deterioration by the driving apparatus 10 will be described below.

Figure 2:
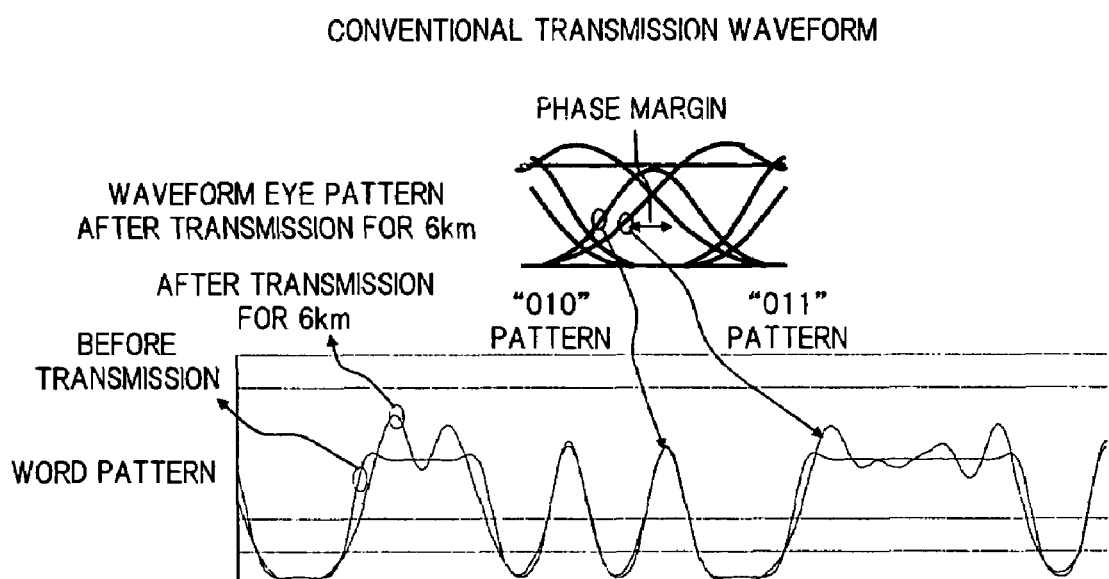
FIG. 2 is a diagram for explaining characteristics of transmission waveform deterioration occurring in a pre-chirped optical signal.
Figure 3:
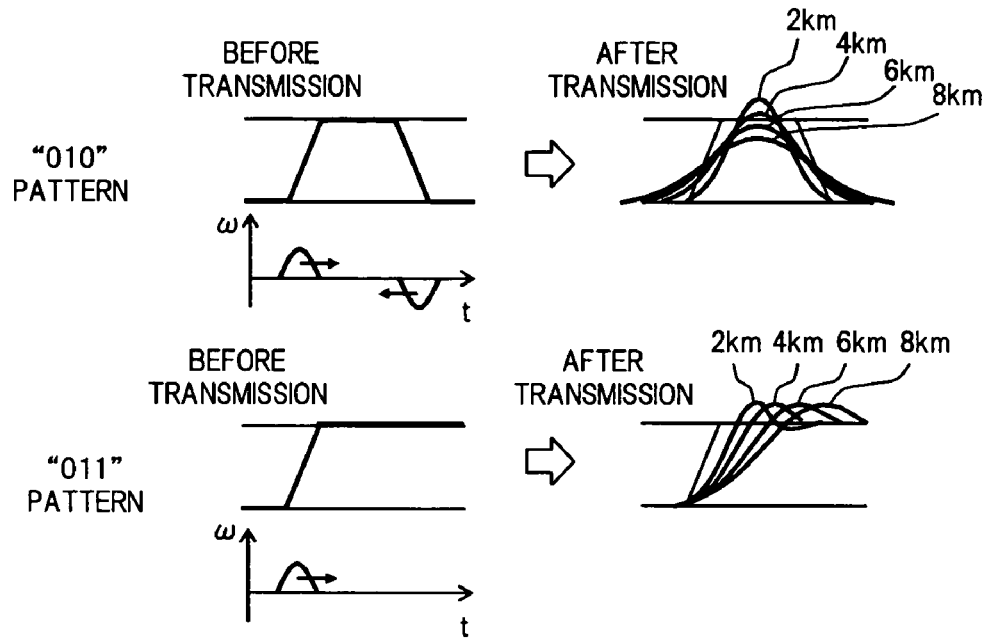
FIG. 3 is a diagram showing a change in waveform of the pre-chirped optical signal corresponding to transmission distances.
Figure 4:
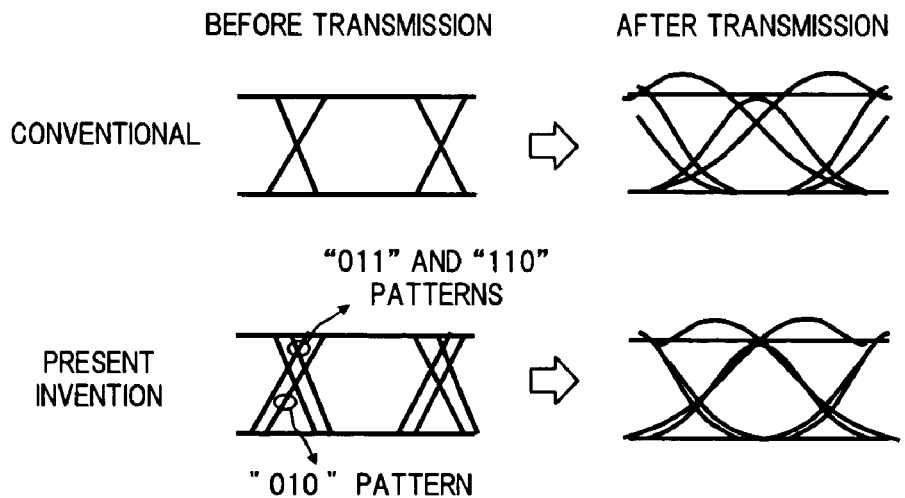
FIG. 4 is a diagram in which optical signal waveforms before and after transmission, which are obtained according to the present invention, are compared with those in a conventional case.

FIGS. 2 to 4 are diagrams for explaining the principle of the operation of compensating for the transmission waveform deterioration by the driving apparatus 10.

The eye pattern shown at the top and the word pattern shown at the bottom of FIG. 2 show one example of a transmission waveform after an ultrahigh-speed optical signal has been transmitted for 6 km, by applying the conventional pre-chirp technique, that is, a signal waveform in the vicinity of a transmission limit. When observing the eye pattern in the transmission waveform in detail, it is seen that the waveform is split into two in the vicinity of the transmission limit, so that the eye pattern is split into a "110" pattern and a pattern other than the "110" pattern. Particularly, it is seen that the pattern which deteriorates the phase margin indicated by an arrowhead line on the eye pattern, is the "011" and "110". In connection with this, for example, considering the case where an optical signal having a negative α parameter is propagated through a transmission path having a positive dispersion value, for the "010" pattern in the optical signal, as shown at the top of FIG. 3, as a transmission distance is extended, an optical pulse is compressed so that the waveform becomes sharp, and after this, when the front and the rear of a difference between the leading and trailing frequencies are changed, the waveform is expanded to be gentle. Therefore, for the "010" pattern, a waveform relatively similar to that before transmission can be obtained, even after transmission for 6 km.

On the other hand, for the "011" pattern, as shown at the bottom of FIG. 3, the optical pulse is compressed from the rise time, and the waveform continues to be compressed with the extension of the transmission distance. Further, although not shown in the figure, the "110" pattern is similar to the "011" pattern, and accordingly, the trailing waveform continues to be compressed, with the extension of the transmission distance. As a result, in the vicinity of 6 km transmission, there occurs a difference in the waveform between the "010" pattern and the respective patterns of "011" and "110", thereby causing the state where the eye pattern is split into two.

In the present invention, by giving an attention to a difference in transmission characteristics corresponding to the data pattern of the pre-chirped optical signal, waveform deterioration due to a wavelength dispersion characteristic of the transmission path is compensated for by making the pulse width of the "1" signal in the second bit of each of the patterns of "011" and "110" wider than the pulse widths in other bits, in the optical signal before transmission, which is to be sent out from the optical transmitter to the transmission path. Specifically, for example, as shown in FIG. 4, in the present invention, by intentionally breaking the waveform of the optical signal to be sent out from the optical transmitter to the transmission path according to the data pattern, the waveform deterioration after the transmission of the optical signal for a predetermined distance can be suppressed, whereas a waveform-shaped optical signal has been conventionally sent out from the optical transmitter to the transmission path. As a result, in the present invention, the transmission distance can be extended to 1.5 to 2 times as long as the conventional transmission distance.

The operation of compensating for transmission waveform deterioration in the present invention is performed based on a phenomenon as waveform compression in which, when an optical signal is transmitted using an optical fiber, the leading and trailing of waveform are respectively moved backward and forward with respect to the time axis. Therefore, under a condition that the waveform compression is applied to a pre-chirped optical signal, the compensation for transmission waveform deterioration according to the present invention effectively functions. The condition for applying the waveform compression can be summarized as shown in Table 1 below.

TABLE 1

| Condition | Coverage (waveform compression/expansion) | |
| --- | --- | --- |
| | Fiber dispersion value > 0 | Fiber dispersion value < 0 |
| α parameter > 0 | No (expansion) | Yes (compression) |
| α parameter < 0 | Yes (compression) | No (expansion) |
| SPM | Yes (compression) | No (expansion) |

Figure 5:
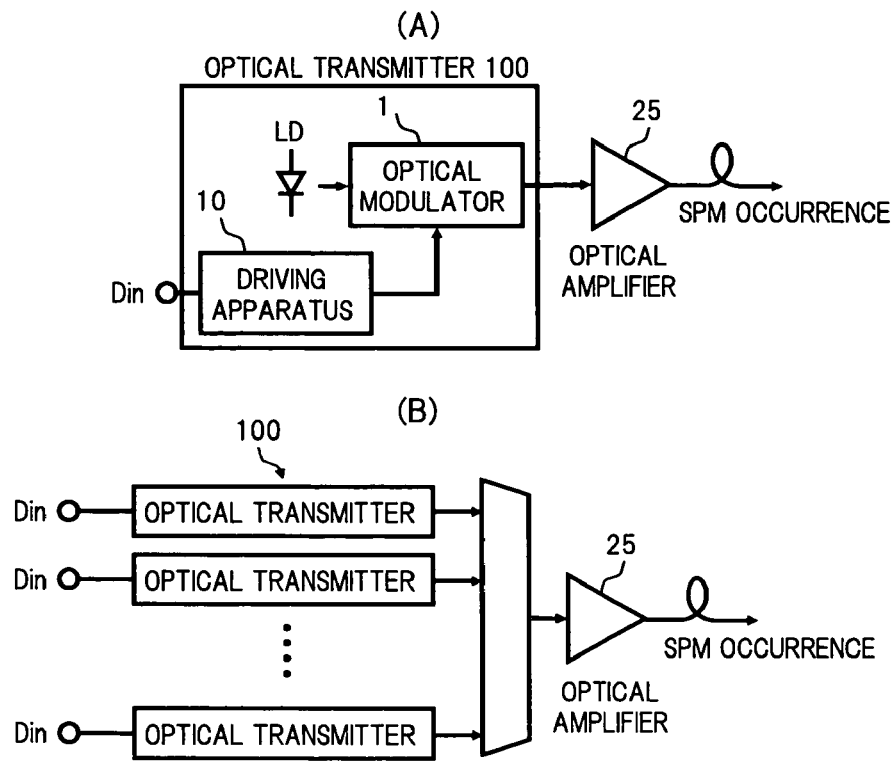
FIG. 5 is a diagram showing a specific example corresponding to a case in which a waveform compression effect can be obtained due to an occurrence of SPM in the first embodiment.

As shown in Table 1, it is a condition for the waveform compression that in the case where an optical fiber having a positive dispersion value with respect to the wavelength of the transmitted light (for example, single mode fiber and the like) is used for the transmission path, the α parameter of the transmitted light is negative, or that in the case where an optical fiber having a negative dispersion value with respect to the wavelength of the transmitted light is used for the transmission path, the α parameter of the transmitted light is positive. Moreover, even in a condition that self phase modulation (SPM) being one of nonlinear effects, occurs in the optical fiber having a positive dispersion value with respect to the wavelength of the transmitted light, a waveform compression effect similar to the above can be obtained. As a specific example of the condition for the occurrence of self phase modulation (SPM), as shown in (A) and (B) of FIG. 5, the case can be considered where an optical amplifier 25 is provided on an output side of the optical transmitter 100 to which the present invention is applied, so that the power of the optical signal sent out to the transmission path is amplified up to a level leading to the nonlinear effect (for example, equal to or higher than +15 dBm in the optical signal of 10 Gb/s).

Next, a pulse width expansion operation for the data signal in the driving apparatus 10 in this embodiment will be described specifically, with reference to a time chart in FIG. 6.

Figure 6:
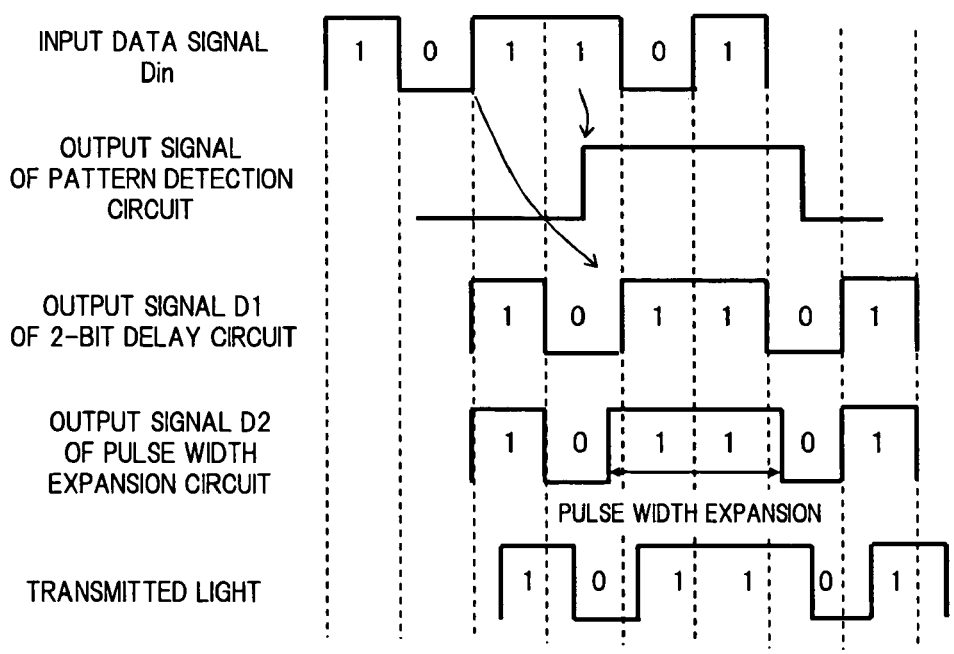
FIG. 6 is a time chart for explaining a pulse width expanding operation for a data signal in the first embodiment.

When a data signal Din having a waveform as shown at the uppermost stage in FIG. 6 is given to the driving apparatus 10 having the circuit configuration as shown in FIG. 1, the data signal Din is sent respectively to the pattern detection circuit 11 and the 2-bit delay circuit 12. In the pattern detection circuit 11, as shown at the second stage in FIG. 6, if "1" in a third bit in a "011" pattern included in the data signal Din is detected, the output signal level is changed over from low to high. When "0" in a third bit in a "110" pattern is detected, the output signal level is changed over from high to low, at timing delayed by 2 bits therefrom.

In the 2-bit delay circuit 12, as shown at the third level in FIG. 6, the data signal D1 obtained by delaying the data signal Din by 2 bits is generated, and the data signal D1 is output to the pulse width expansion circuit 13. In the pulse width expansion circuit 13, as shown at the fourth level in FIG. 6, the data signal D2, in which the pulse width of the "1" signal in the second bit in the "011" pattern in the data signal D1 from the 2-bit delay circuit 12, and the pulse width of the "1" signal in the second bit in the "110" pattern are expanded by a previously set length, is generated to be output to the driving circuit 14.

In the driving circuit 14, the driving signal whose voltage level is changed corresponding to the data signal D2 from the pulse width expansion circuit 13, is generated, and the driving signal is applied to the signal electrode in the optical modulator 1, so that a continuous light to be given to the optical modulator 1 is modulated, and at the same time, wavelength chirp of a required amount is applied to the continuous light, and an optical signal whose level is changed at timing as shown at the fifth level in FIG. 6 is sent out to the transmission path. The optical signal to be sent out to the transmission path from the optical modulator 1 has the eye pattern as shown at bottom left in FIG. 4. If the optical signal having such a waveform is propagated through the transmission path, the compensation for transmission waveform deterioration is performed in accordance with the principle based on the waveform compression, and hence the eye pattern of the optical signal after transmission has a favorable shape as shown at bottom right in FIG. 4.

According to the optical transmitter 100 in the embodiment as described above, an ultrahigh-speed optical signal of for example 40 Gb/s can be transmitted over a long distance, without performing the dispersion compensation using a complicated circuit on the optical receiver side as in the conventional technique.

A specific embodiment of the optical transmitter 100 in the first embodiment will be described below.

Figure 7:
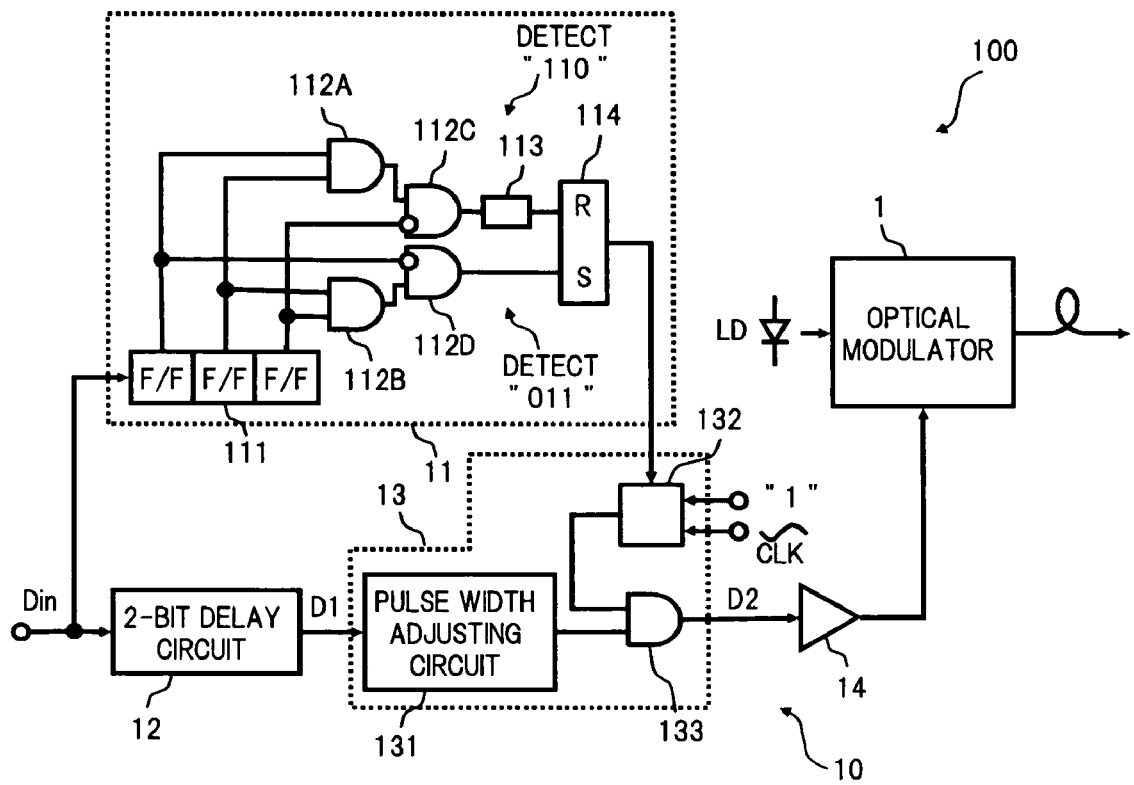
FIG. 7 is a circuit diagram showing a specific embodiment of the optical transmitter of the first embodiment.

FIG. 7 is a diagram showing a circuit configuration of one embodiment of the optical transmitter 100.

In the circuit configuration shown in FIG. 7, for example, the pattern detection circuit 11 is configured using a 3-bit shift register circuit 111, four AND gates 112A to 112D, a 2-bit delay circuit 113, and an RS latch circuit 114, and the pulse width expansion circuit 13 is configured using a pulse width adjusting circuit 131, a route changeover circuit 132 and an AND gate 133.

In the pattern detection circuit 11, the "011" pattern and the "110" pattern in the input data signal Din are respectively detected by the combination of the 3-bit shift register circuit 111 and each of the AND gates 112A to 112D. An output signal from the AND gate 112D indicating the detection result of the "011" pattern is given to the RS latch circuit 114, and an output signal from the AND gate 112C indicating the detection result of the "110" pattern is given to the RS latch circuit 114 via the 2-bit delay circuit 113. As a result, a signal, which becomes a high level during a period until two bits elapse from the detection of the "110" pattern after the "011" pattern is detected, is output from the RS latch circuit 114. An output signal indicating the pattern detection result in the pattern detection circuit 11 is given to a control terminal of the route changeover circuit 132 in the pulse width expansion circuit 13.

The route changeover circuit 132 is given with a voltage signal equivalent to "1" level at one of two input terminals thereof, and a clock signal CLK synchronized with the data signal Din and having a frequency corresponding to the bit rate of the data signal Din at the other input terminal thereof. The changeover between the input/output terminals is performed so that when the output signal from the RS latch circuit 114 is a high level, the "1" level signal is output, and when the output signal is a low level, the clock signal CLK is output. In the pulse width adjusting circuit 131, the leading and trailing timing of the data signal D1 delayed by the 2-bit delay circuit 12 is adjusted, thereby outputting a signal in which the pulse width of the "1" signal is expanded by a previously set length. Moreover, by providing the respective output signals from the pulse width adjusting circuit 131 and the route changeover circuit 132 to respective input terminals of the AND gate 133, then as shown at the fourth level in FIG. 6, the data signal D2 in which the pulse width from the "1"

signal in the second bit in the "011" pattern to the "1" signal in the second bit in the "110" pattern is expanded, is output from the AND gate 133, to be given to the driving circuit 14.

Figure 8:
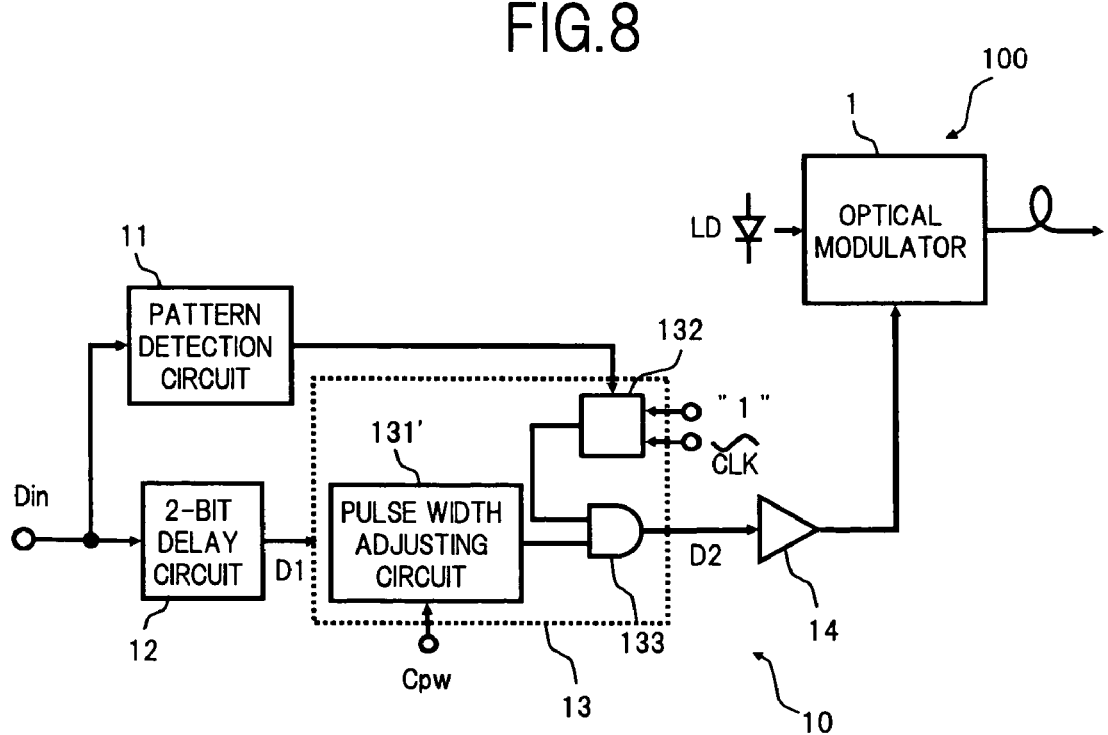
FIG. 8 is a diagram showing another circuit configuration relating to the embodiment in FIG. 7.
Figure 9:
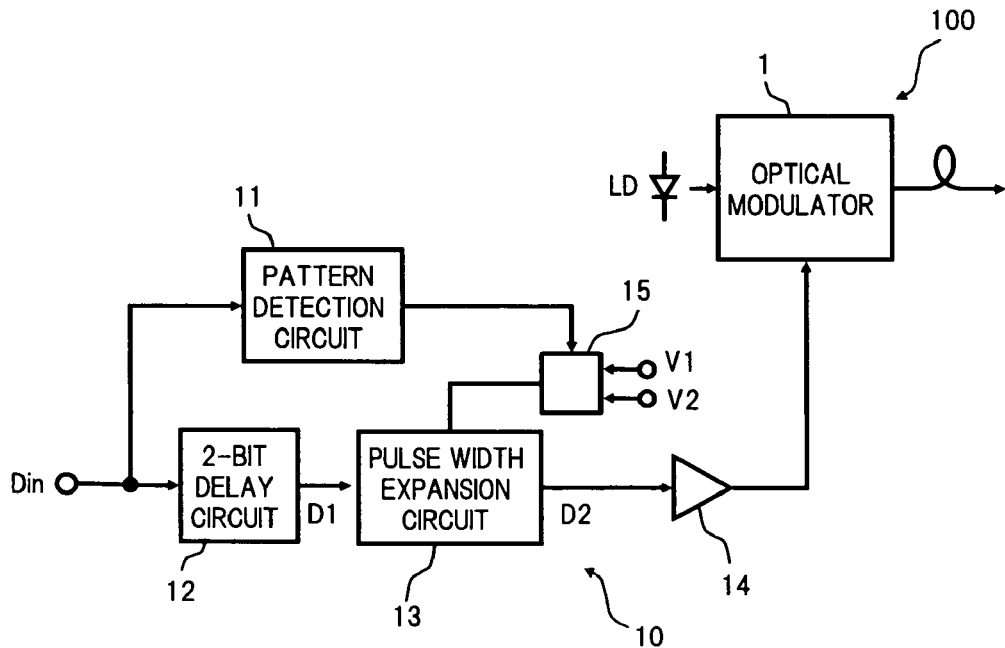
FIG. 9 is a diagram showing a modified embodiment of the circuit configuration shown in FIG. 8.

In the circuit configuration in FIG. 7, there has been shown an example in which a variable amount of the pulse width in the pulse width expansion circuit 13 is fixed by the previously set value. However, as shown in FIG. 8, a pulse width adjusting circuit 131' comprising a control terminal may be used, so that an expansion amount of the pulse width is adjusted by giving a pulse width control signal Cpw from outside to the control terminal. As a result, the variable amount of the pulse width can be optimized according to the transmission distance, the dispersion value of the transmission path, and the setting of the α parameter. Moreover, as a modification example of the circuit configuration shown in FIG. 8, as shown in FIG. 9, the pulse width expansion circuit 13 capable of controlling voltage can be applied to change over control voltages V1 and V2 to be given to the pulse width expansion circuit 13 in accordance with the output signal from the pattern detection circuit 11, utilizing an analog switch 15.

Figure 10:
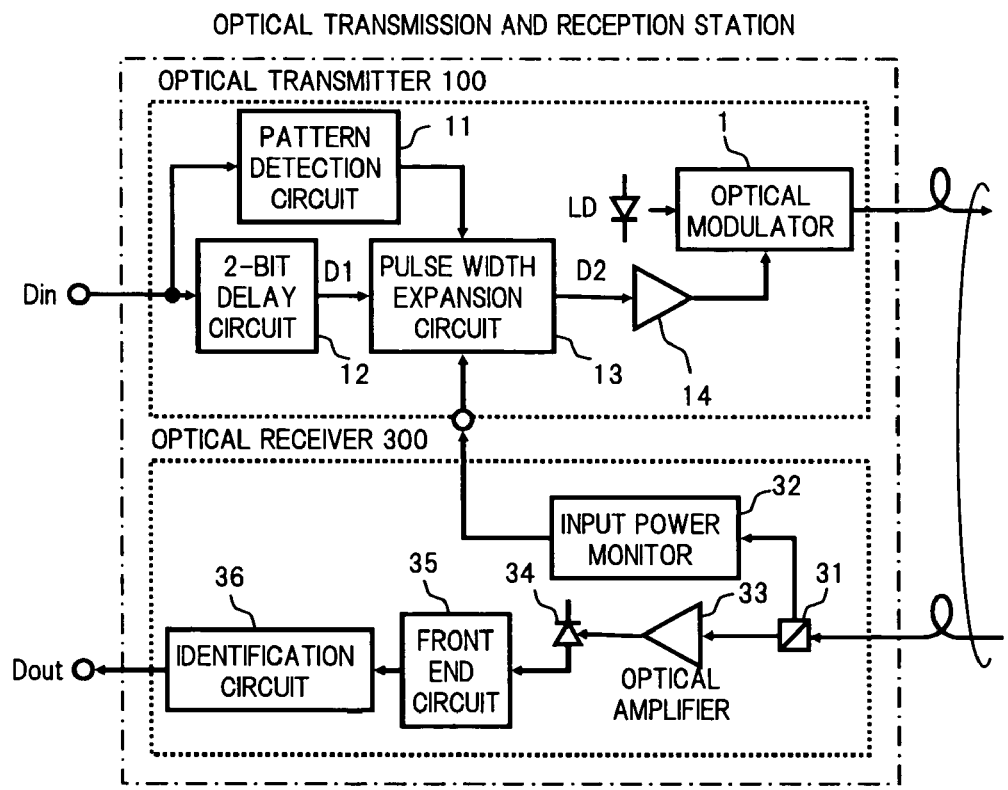
FIG. 10 is a diagram showing a preferable configuration example of an optical transmission and reception station relating to the embodiment in FIG. 7.

When the variable amount of the pulse width in the pulse width expansion circuit 13 is made controllable, for example, as in an optical transmission and reception station shown in FIG. 10, it is preferable to control the pulse width variable amount on a transmission side according to the input power monitored on a receiving side. Specifically, in the optical transmission and reception station accommodating therein an optical transmitter 100 which transmits an optical signal to one of circuits opposed to each other and an optical receiver 300 which receives an optical signal transmitted on the other circuit, a part of the optical signal input to the optical receiver 300 is branched by an optical coupler 31, and the power of the branched light is measured by an input power monitor 32. An optical amplifier 33, a light receiving element 34, a front end circuit 35 and an identification circuit 36 connected to the latter stage of the optical coupler 31 have the same configuration as that of a typical optical receiver. The measurement result of the input power monitor 32 is transmitted to the pulse width expansion circuit 13 via a pulse width control port of the optical transmitter 100. In the pulse width expansion circuit 13, the length and the like of the transmission path is estimated based on the reception power in the opposing circuit, and an expansion amount of the pulse width suitable for compensating for the transmission waveform deterioration occurring in the own circuit is determined. By controlling the expansion amount of the pulse width on the transmission side utilizing the reception power of the opposing circuit, the transmission waveform deterioration can be compensated for with higher accuracy.

Figure 11:
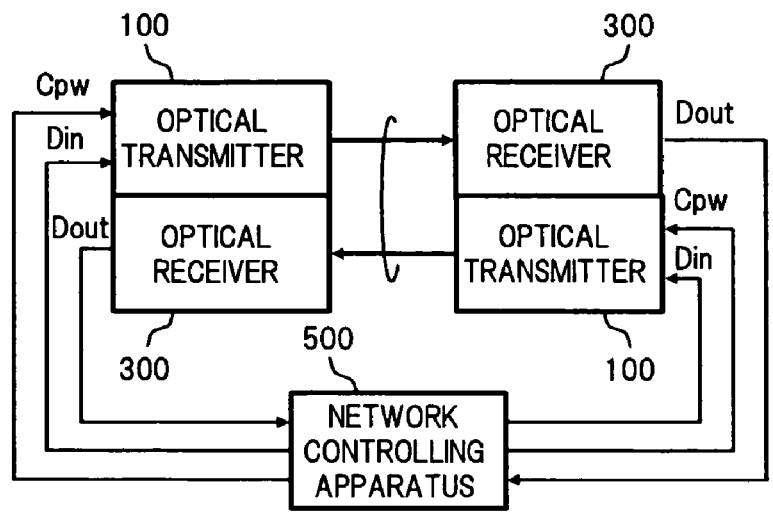
FIG. 11 is a diagram showing an application example relating to the configuration example in FIG. 10.

As an application of the configuration in which the optical transmitter 100 and the optical receiver 300 are combined with each other, for example, as shown in FIG. 11, the expansion amounts of the pulse width in the respective optical transmitters 100 may be respectively controlled by a network controlling apparatus 500 for monitoring and controlling a plurality of optical transmission and reception stations on the optical network Information relating to the operation setting of the optical transmitter 100 and the error rate in the optical receiver 300 in each optical transmission and reception station, the length of the optical fiber used in the transmission path and the like, is collected in the network controlling apparatus 500. Therefore, if the optimum pulse width corresponding to each optical transmitter 100 is judged based on the information, and the result thereof is given to the corresponding optical transmitter 100 as the pulse width control signal Cpw, the expansion amount of the pulse width on the transmission side can be optimized, even if the optical coupler 31 and the input power monitor 32 for controlling the pulse width are not provided in the individual optical receiver 300 as shown in FIG. 10.

Next, there will be described a second embodiment of the optical transmitter according to the present invention.

Figure 12:
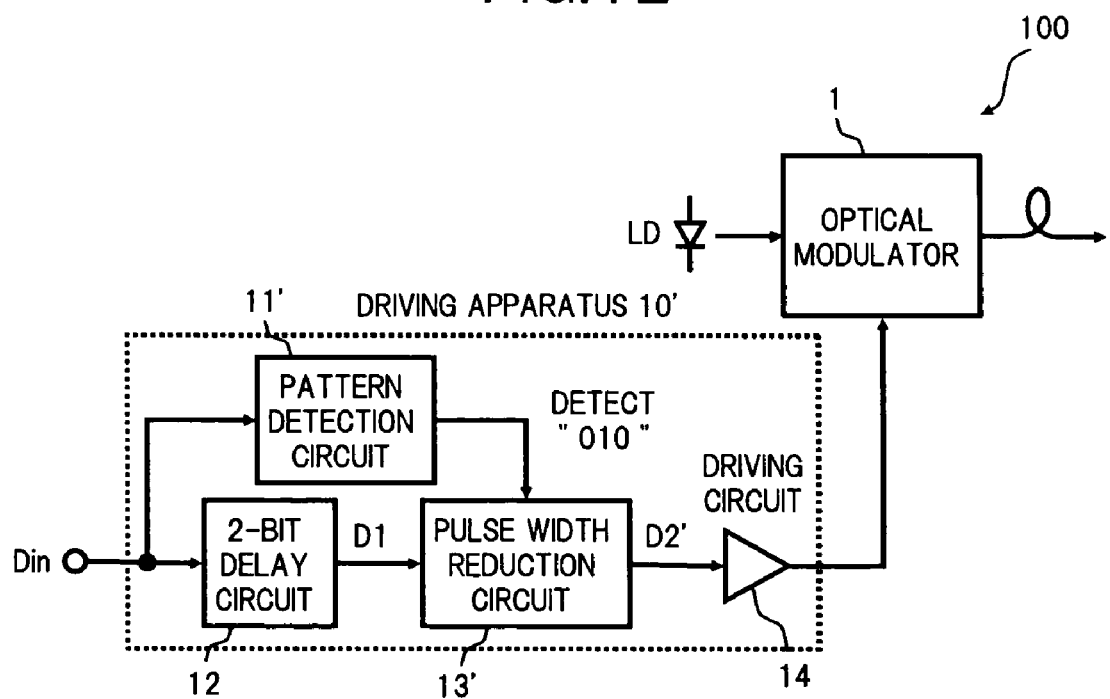
FIG. 12 is a diagram showing a configuration of an optical transmitter according to a second embodiment of the present invention.

FIG. 12 is a diagram showing a configuration of the optical transmitter according to the second embodiment.

As shown in FIG. 12, the optical transmitter 100 in this embodiment is provided with a pattern detection circuit 11' which detects the "010" pattern, instead of the pattern detection circuit 11 which detects the respective patterns of "011" and "110" in the first embodiment (FIG. 1), and also a driving apparatus 10' provided with a pulse width reduction circuit 13', instead of the pulse width expansion circuit 13. The respective configurations of the driving apparatus 10' other than the pattern detection circuit 11' and the pulse width reduction circuit 13', and the optical modulator 1 are the same as those in the first embodiment, and hence the description thereof is omitted.

Figure 13:
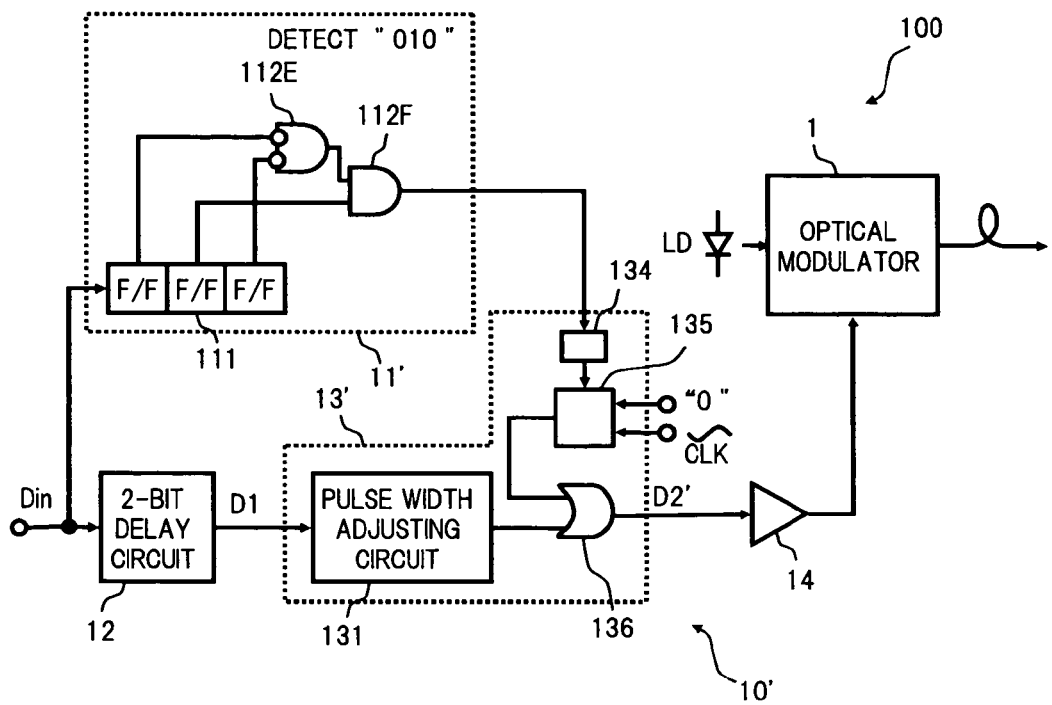
FIG. 13 is a circuit diagram showing a specific embodiment of the optical transmitter of the second embodiment.

Specifically, the pattern detection circuit 11' is configured using a 3-bit shift register circuit 111 and two AND gates 112E and 112F, as shown in FIG. 13 for example, and the "010" pattern in the input data signal Din is detected, and an output signal of the AND gate 112F indicating the detection result is sent to the pulse width reduction circuit 13'.

The pulse width reduction circuit 13' is configured using the pulse width adjusting circuit 131, a delay circuit 134, a route changeover circuit 135 and an OR gate 136 as shown in FIG. 13 for example. To the pulse width adjusting circuit 131 is applied the data signal D1 delayed by the 2-bit delay circuit 12, and a signal is generated for which the pulse width of the "1" signal is reduced by a previously set length. To one of the two input terminals of the route changeover circuit 135 is applied a voltage signal corresponding to the "0" level, and to the other input terminal is applied a clock signal CLK, and switching is performed between the input and output terminals so that when the signal applied from the pattern detection circuit 11' to the control terminal via the delay circuit 134 is a high level, a "0" level signal is output, and when a low level, a clock signal CLK is output. To the OR gate 136, is respectively applied the output signals from pulse width adjusting circuit 131 and the route changeover circuit 135.

Figure 14:
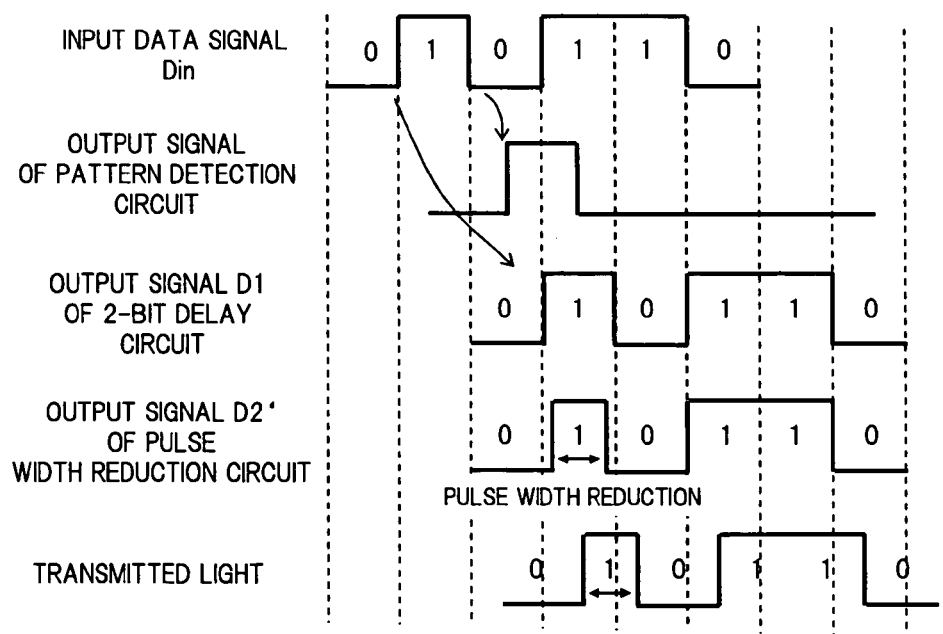
FIG. 14 is a time chart for explaining a pulse width reducing operation for a data signals in the second embodiment.

In the driving apparatus 10' having such a configuration, when the data signal Din having a waveform, as shown at the uppermost level in FIG. 14 for example, is provided, the data signal Din is respectively sent to the pattern detection circuit 11' and the 2-bit delay circuit 12, in the same manner as in the first embodiment. In the pattern detection circuit 11', as shown at the second level in FIG. 14, when "0" in a third bit of the "010" pattern included in the data signal Din is detected, the output signal level is changed over from low to high. In the 2-bit delay circuit 12, as shown at the third level in FIG. 14, the data signal D1 in which the data signal Din is delayed by 2 bits, is generated, and the data signal D1 is output to the pulse width reduction circuit 13'. The pulse width reduction circuit 13' receives the high-level output signal from the pattern detection circuit 11', to generate a data signal D2', in which the pulse width of the "1" signal in the second bit in the "010" pattern in the data signal D1 from the 2-bit delay circuit 12 is reduced by a previously set length as shown at the fourth level in FIG. 14, and the data signal D2' is output to the driving circuit 14. The driving circuit 14 generates a driving signal, whose voltage level is changed according to the data signal D2' from the pulse width reduction circuit 13'. Since the driving signal is applied to the signal electrode in the optical modulator 1, the continuous light given to the optical modulator 1 is modulated, and at the same time, waveform chirp of a required amount is given, and an optical signal whose level is changed at timing as shown at the fifth level in FIG. 14 is sent out to the transmission path. As a result, the transmission waveform deterioration is compensated for in accordance with the principle based on the waveform compression.

Next, there will be described a third embodiment of the optical transmitter according to the present invention.

Figure 15:
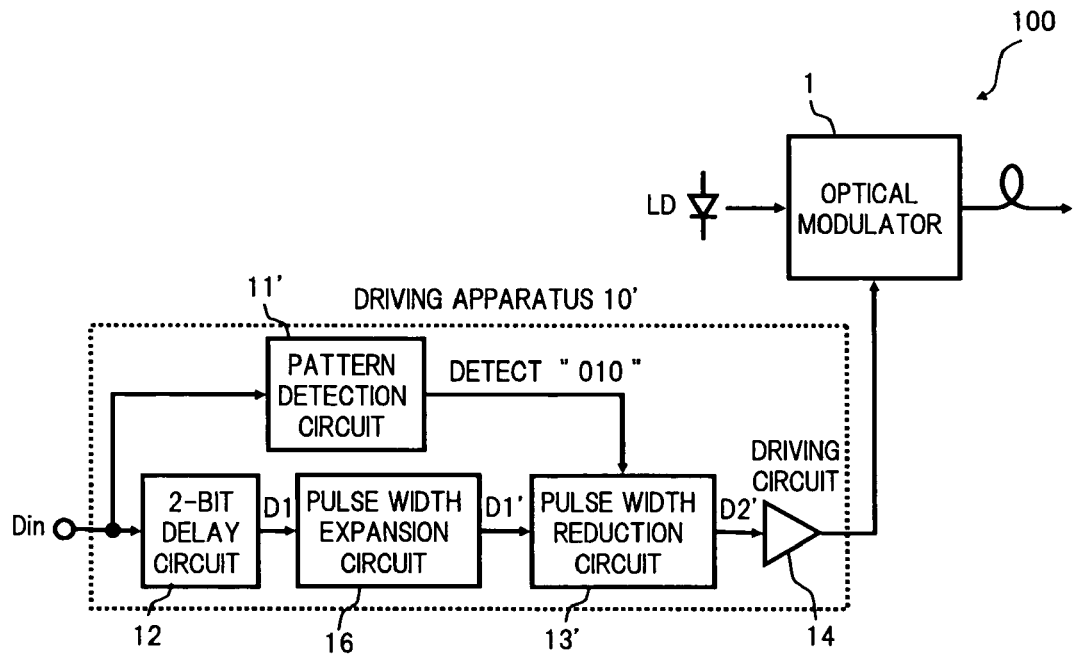
FIG. 15 is a diagram showing a configuration of an optical transmitter according to a third embodiment of the present invention.

FIG. 15 is a diagram showing a configuration of the optical transmitter according to the third embodiment.

In FIG. 15, the point where the configuration of this optical transmitter 100 is different to that of the second embodiment shown in FIG. 12, is that in the driving apparatus 10' there is provided a pulse width expansion circuit 16 between the 2-bit delay circuit 12 and the pulse width reduction circuit 13'. The configuration other than this is the same as for the case of the second embodiment.

To the pulse width expansion circuit 16 is applied the data signal D1 output from the 2-bit delay circuit 12, and a data signal D1' is generated for which the pulse width of all of the "1" signals in the data signal D1 is expanded by a previously set length, and this data signal D1' is output to the pulse width reduction circuit 13'.

Figure 16:
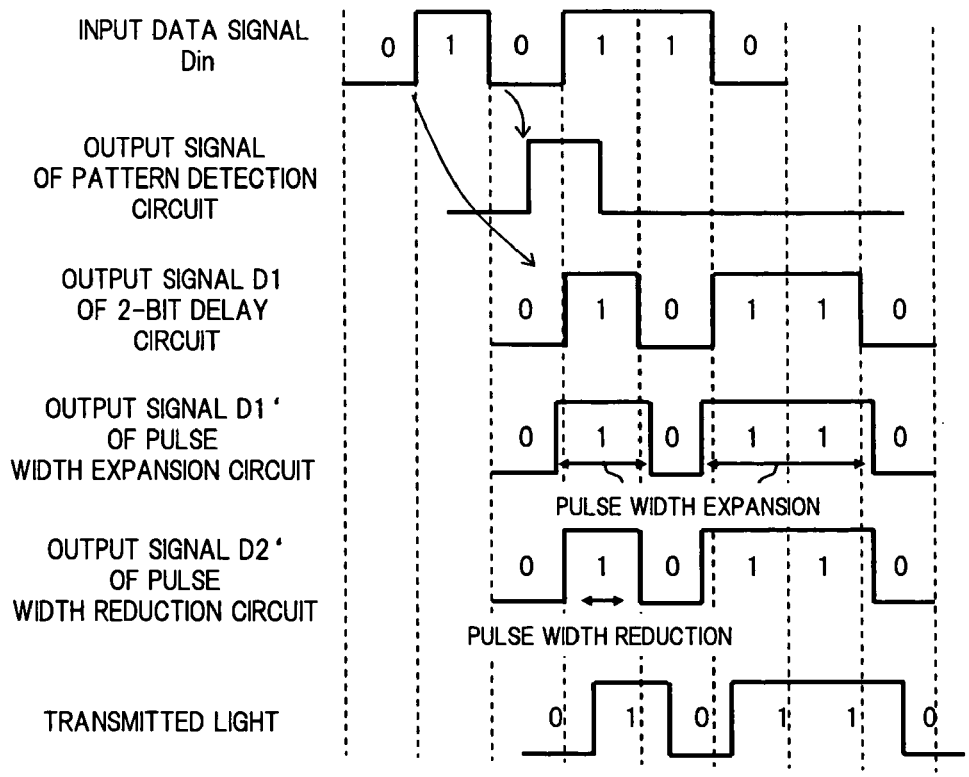
FIG. 16 is a time chart for explaining a pulse width adjusting operation for a data signals in the third embodiment.

In the driving apparatus 10' having such a configuration, when the data signal Din having a waveform, as shown at the uppermost level in FIG. 16 for example, is provided, the data signal Din is respectively send to the pattern detection circuit 11' and the 2-bit delay circuit 12.

In the pattern detection circuit 11', as shown in the second level in FIG. 16, when "0" of the third bit of the "010" pattern included in the data signal Din is detected, the output signal level is changed over from low to high. In the 2-bit delay circuit 12, as shown in the third level in FIG. 16, the data signal D1 in which the data signal Din is delayed by 2 bits, is generated, and the data signal D1 is output to the pulse width expansion circuit 16. In the pulse width expansion circuit 16, as shown in the fourth level in FIG. 16, a data signal D1' in which the pulse width of all of the "1" signals in the data signal D1 is expanded is generated, and this data signal D1' is output to the pulse width reduction circuit 13'. The pulse width reduction circuit 13', as with the aforementioned case of the second embodiment, receives the high level output signal from the pattern detection circuit 11', to generate a data signal D2', in which the pulse with of the "1" signal in the second bit of the "010" pattern in the data signal D1' from the pulse width expansion circuit 16 is reduced, as shown in the fifth level in FIG. 16, and the data signal D2' is output to the driving circuit 14. The driving circuit 14 generates a driving signal, whose voltage level is changed according to the data signal D2 from the pulse width reduction circuit 13'. Since this drive signal is applied to the signal electrode in the optical modulator 1, the continuous light given to the optical modulator 1 is modulated, and at the same time, a waveform chirp of a required amount is given, and an optical signal whose level is changed at timing as shown at the sixth level in FIG. 16, is sent to the transmission path. As a result, the transmission waveform deterioration is compensated for in accordance with the principle based on the waveform compression.

In this way, by providing the pulse width expansion circuit 16 after the 2-bit delay circuit 12, and expanding the pulse width of all of the "1" signals of the D1, and narrowing the pulse width of the "1" signal of the appropriate pattern only when the "010" pattern is detected, the pulse width of "1" signal of the optical signal sent to the transmission path does not become narrow as for the case of the second embodiment. Therefore, an optical signal of substantially the same waveform as for the case of the first embodiment can be obtained.

Also in the second and third embodiments, the pulse width adjusting circuit 131' having a control terminal may be used, as in the circuit configuration shown in FIG. 8, to adjust the reduction amount of the pulse width. Modifications as shown in FIGS. 9 to 11 are possible as well.

Next, each application example of the embodiments will be described below.

Figure 17:
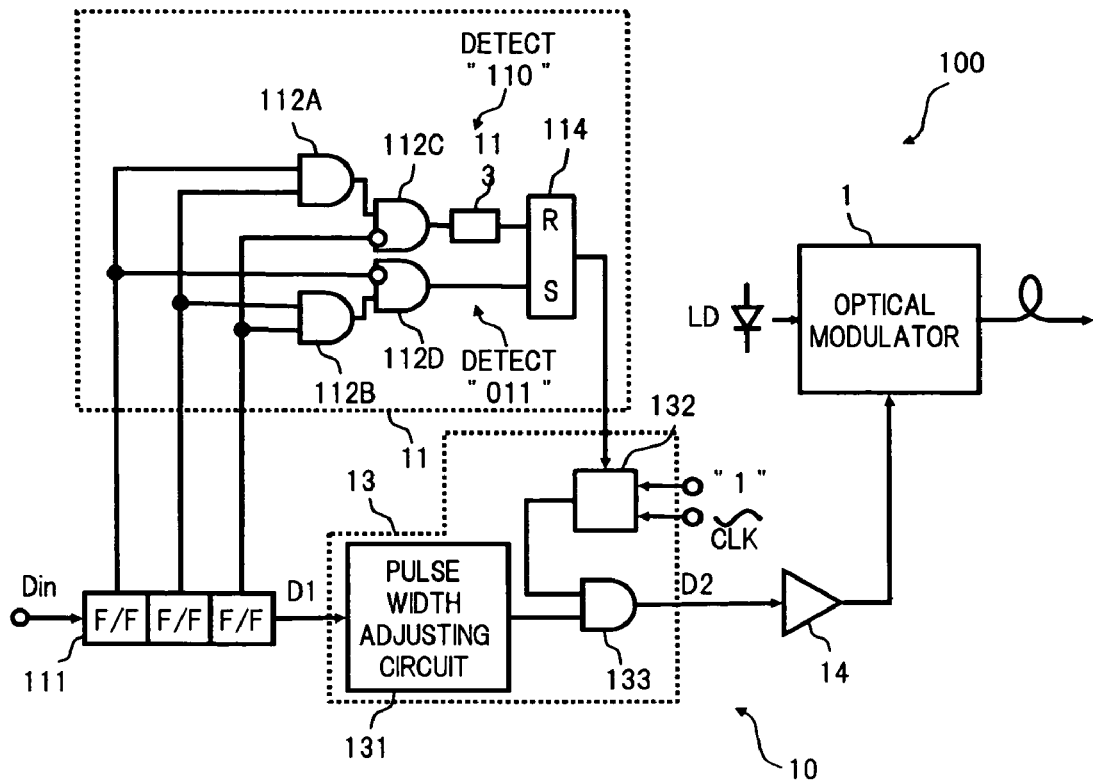
FIG. 17 is a diagram showing an application example relating to the circuit configuration in FIG. 7.
Figure 18:
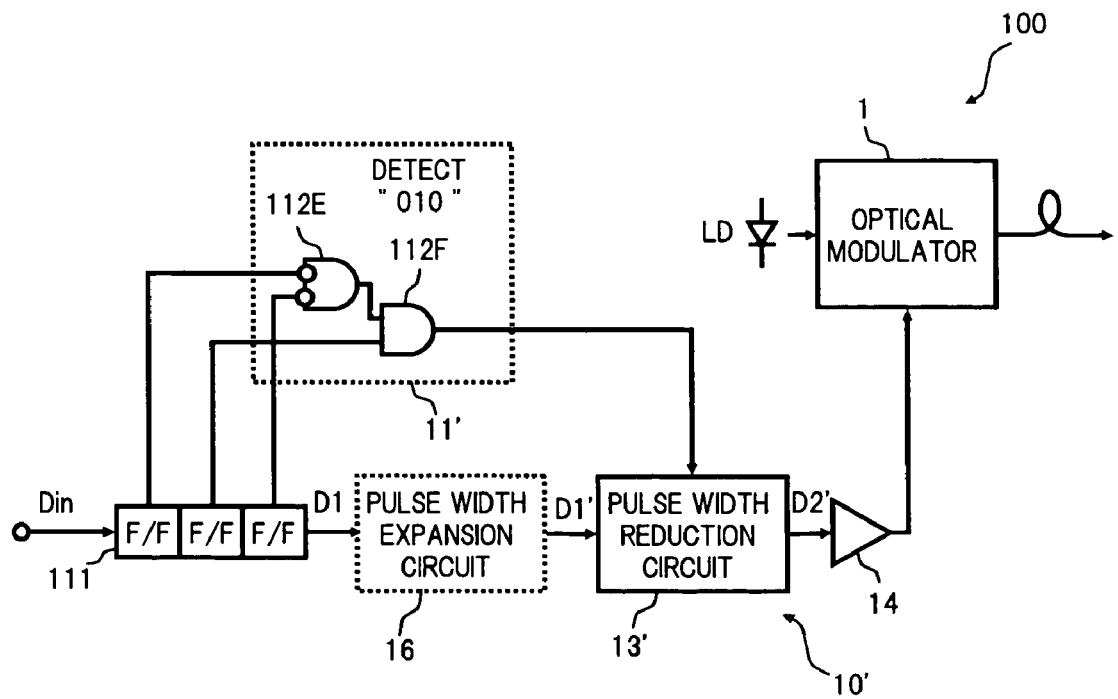
FIG. 18 is a diagram showing an application example relating to the circuit configuration in FIG. 13.

FIG. 17 is a diagram showing an application example relating to the specific circuit configuration of the first embodiment shown in FIG. 7. FIG. 18 is a diagram showing an application example relating to the specific circuit configuration of the second and third embodiments shown in FIG. 13 and FIG. 15.

In the application examples shown in FIGS. 17 and 18, the 3-bit shift register circuit 111 having been provided in each of the pattern detection circuits 11 and 11' is arranged in a main signal system, instead of the 2-bit delay circuit 12 used in the first and the second embodiments. Thus, even when the 3-bit shift register circuit 111 is provided in the main signal system, and the data signal D1 having passed through the 3-bit shift register circuit 111 is given to the pulse width adjusting circuit 131, a similar function to that obtained by using the 2-bit delay circuit 12 can be obtained. Therefore, the circuit configuration can be simplified, thus enabling realization of small size and low cost driving apparatuses 10 and 10'.

Figure 19:
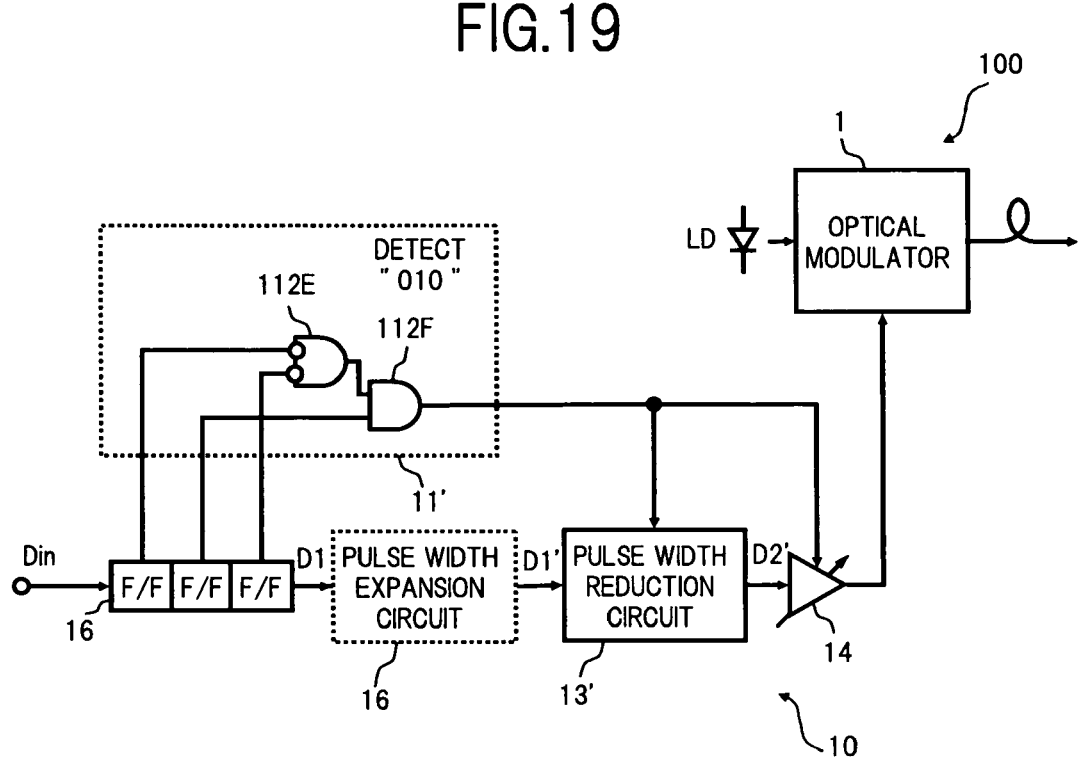
FIG. 19 is a diagram showing another application example of the optical transmitter in FIG. 18.

FIG. 19 is a diagram showing another application example of the driving apparatus 10' shown in FIG. 18.

When the "010" pattern detection is performed as in the second and third embodiments, by performing not only the control of the pulse width of the transmitted light controlled, that is, the optimization of the waveform of the transmitted light in a phase direction, but also the optimization of the amplitude direction, it becomes possible to make the waveform of the optical signal after transmission more favorable. Here, the output signal from the pattern detection circuit 11' is sent to the pulse width reduction circuit 13', and to the driving circuit 14 simultaneously, to control so that the amplitude of the driving signal corresponding to the "1" signal in the second bit in the "010" pattern becomes larger than those in other bits. As a result, the drop of the "1" level due to the expansion of the "010" pattern in the waveform after transmission (refer to upper right in FIG. 3) is compensated for, so that the transmission distance can be further extended.

Figure 20:
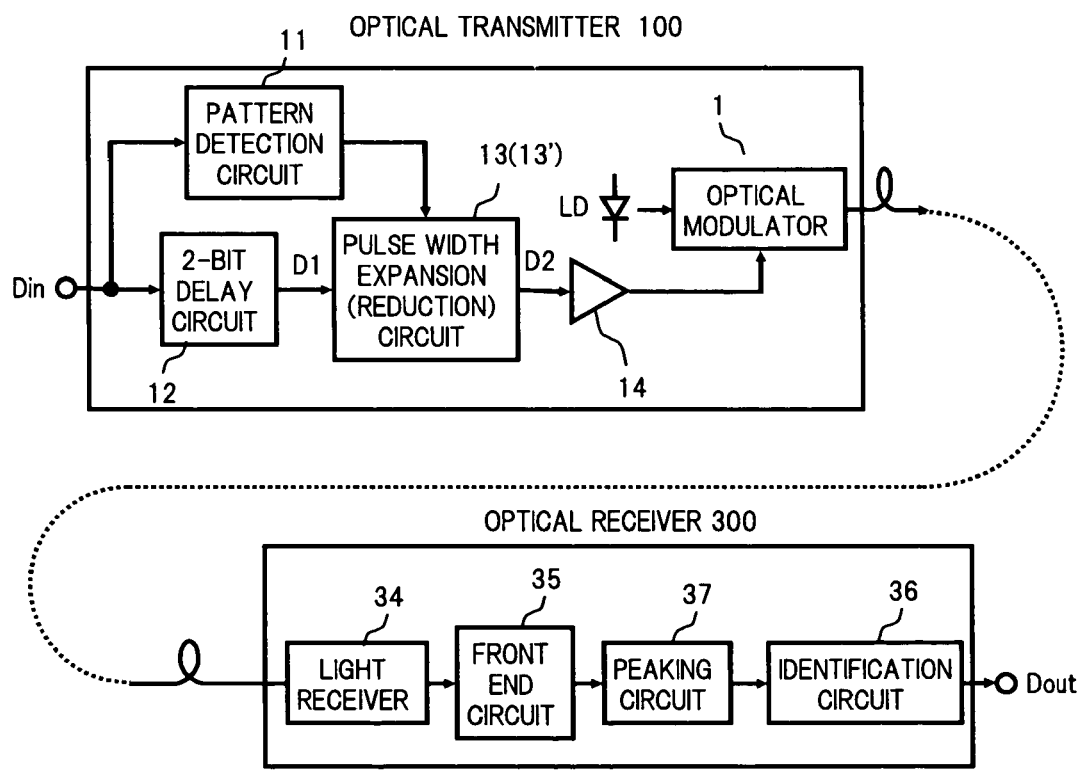
FIG. 20 is a diagram showing a configuration of the case where transmission waveform deterioration is compensated for also on an optical receiving side, as another application example of the first embodiment.

FIG. 20 is a diagram showing a configuration in the case where the transmission waveform deterioration is compensated for also on the optical receiver side, as another application example of the first embodiment.

Figure 21:
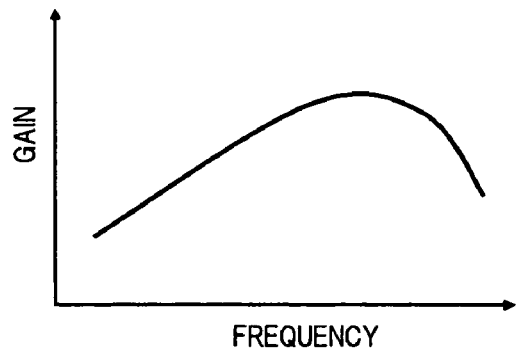
FIG. 21 is a diagram showing one example of a gain-frequency characteristic of a peaking circuit in FIG. 20.

In FIG. 20, the optical transmitter 100 has the same configuration as that of the first embodiment shown in FIG. 1. The optical receiver 300 connected to the optical transmitter 100 via the transmission path includes, a peaking circuit 37 provided between the front end circuit 35 and the identification circuit 36, in addition to the typical configuration including the light receiver 34, the front end circuit 35 and the identification circuit 36. The peaking circuit 37, for example as shown in FIG. 21, has a gain-frequency characteristic, in which a peak exists in the vicinity of a frequency band corresponding to the bit rate of the data signal Din. As a specific configuration of the peaking circuit 37 having such a gain-frequency characteristic, a known circuit configuration disclosed in FIG. 5 of Japanese Unexamined Patent Publication No. 9-64920 can be used.

By providing the peaking circuit 37 in the optical receiver 300, band deterioration occurring during a period until the optical signal transmitted from the optical transmitter 100 is propagated through the transmission path to be received by the optical receiver 300, that is, the drop in the power of the transmitted light in the frequency band corresponding to the bit rate of the data signal Din, can be compensated for by the peaking circuit 37, thereby enabling further extension of the transmission distance of the optical signal.

Here an application example for the first embodiment has been shown. However, this may also be applied to the second and third embodiments in a similar manner to the above case.

Figure 22:
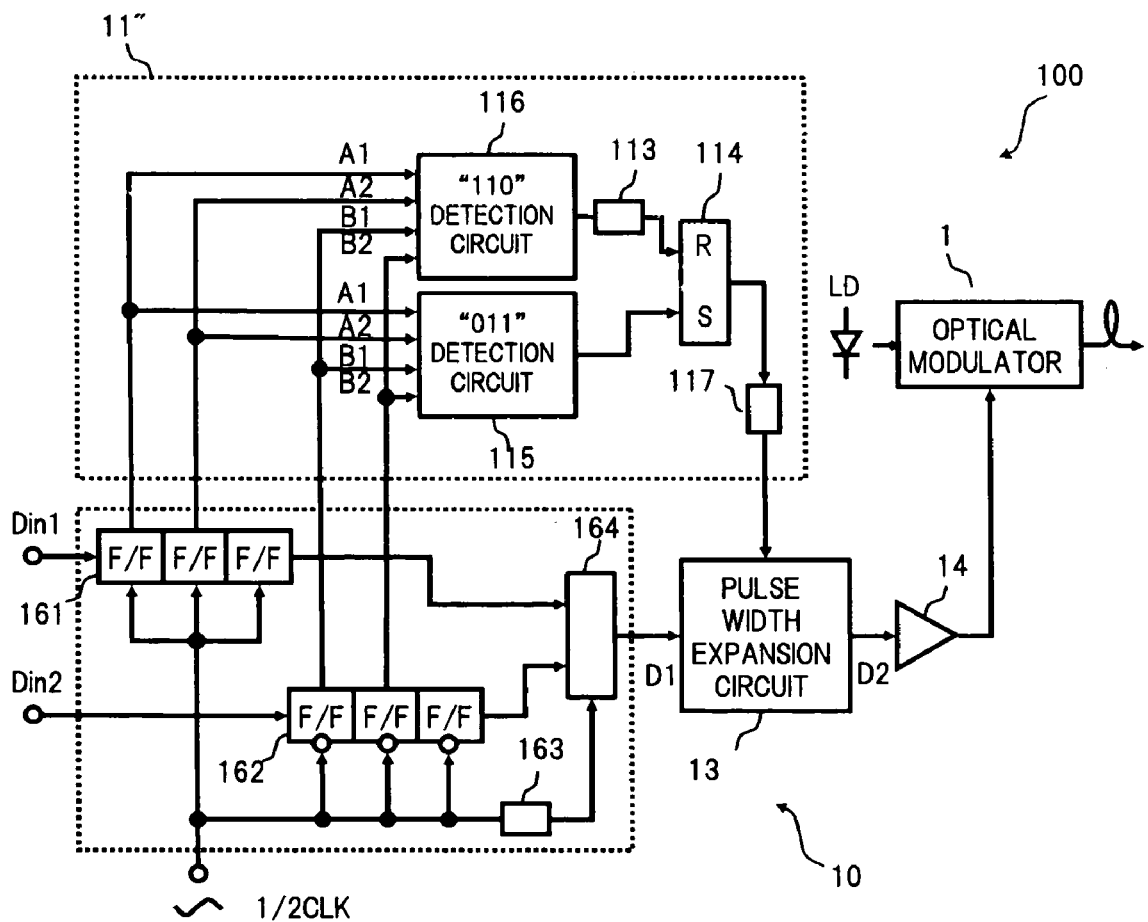
FIG. 22 is a diagram showing a configuration in the case where a clock signal of a frequency of half the bit rate is used, as another application example of the first embodiment.

FIG. 22 is a diagram showing a configuration of another application example of the first embodiment.

In the first embodiment described above, when the bit rate of the data signal Din to be given to the driving circuit 10 exceeds 40 Gb/s, it is not easy to generate a clock signal of the frequency corresponding thereto. Therefore, it is considered to utilize a clock signal of the frequency of half the bit rate to correspond to the ultrahigh-speed data signal. In the case where the present invention is applied to a circuit in which such a clock signal of the frequency of half the bit rate is used, for example as shown in FIG. 22, two 3-bit shift register circuits 161 and 162 are provided respectively corresponding to two data signals Din1 and Din2 each having a bit rate of half the bit rate of the optical signal to be sent out from the optical modulator 1. The respective 3-bit shift register circuits 161 and 162 latch the respective data signals Din1 and Din2, in synchronism with the clock signal of the frequency of half the bit rate. Here, a signal indicating the data held in first and second bits of the 3-bit shift register circuit 161 is given to respective input terminals A1 and A2 of a "011" detection circuit 115 and a "110" detection circuit 116 in the pattern detection circuit 11", and a signal indicating the data held in first and second bits of a 3-bit shift register circuit 162 is given to respective input terminals B1 and B2 of the "011" detection circuit 115 and the "110" detection circuit 116. Moreover, the respective data signals Din1 and Din2 having passed through the respective 3-bit shift register circuits 161 and 162 are sent to a selector circuit 164. A clock signal of the frequency of half the bit rate is provided to the selector circuit 164 via a π/2 delay circuit 163, and the data signals Din1 and Din2 from the 3-bit shift register circuits 161 and 162 are selectively output in synchronism with the clock signal, to be sent to the pulse width expansion circuit 13.

The "011" detection circuit 115 refers to a table shown in (A) of FIG. 23, based on the data given to the respective input terminals A1, A2, B1 and B2, to detect the "011" pattern in the optical signal to be sent out to the transmission path, and outputs a signal indicating the result to the RS latch circuit 114. The "110" detection circuit 116 refers to a table shown in (B) of FIG. 23, based on the data given to the respective input terminals A1, A2, B1 and B2, to detect the "110" pattern in the optical signal to be sent out to the transmission path, and outputs a signal indicating the result to the RS latch circuit 114 via the 2-bit delay circuit 113. The RS latch circuit 114 generates a signal which becomes a high level during a period until two bits elapse from the detection of the "110" pattern after the "011" pattern is detected, to give the signal to the pulse width expansion circuit 13 via a delay circuit 117. The respective configurations of the pulse width expansion circuit 13, the driving circuit 14 and the optical modulator 1 are the same as those in the first embodiment.

By applying the above configuration, the same function and effect as in the first embodiment can be obtained using the clock signal of the frequency of half the bit rate. As a result, even when the bit rate of the optical signal to be sent out from the optical modulator exceeds 40 Gb/s, the driving apparatus according to the present invention can be realized relatively easily.

In the embodiment shown in FIG. 22, the circuit configuration corresponding to the first embodiment has been shown in which the "011" pattern and the "110" pattern in the optical signal to be sent out from the optical modulator 1 to the transmission path are detected to expand the pulse width. However, it is also possible to realize the circuit configuration corresponding to the second and third embodiments in which the "010" pattern is detected to compress the pulse width.

What is claimed is:

1. A driving method of an optical modulator which generates an optical signal modulated in accordance with a data signal to send out said optical signal to a transmission path, comprising:

detecting a "011" pattern and a "110" pattern in said data signal, and also generating a delay data signal in which said data signal is delayed by 2 bits;

generating a pulse width expanding data signal, in which the pulse width of a "1" signal in a second bit of the "011" pattern and the pulse width of a "1" signal in a second bit of the "110" pattern in said delay data signal are expanded to be wider than the pulse width of other bits, according to the pattern detection result; and driving said optical modulator in accordance with said pulse width expanding data signal, and sending out an optical signal to be waveform-compressed in the transmission path, to the transmission path.

2. A driving method of an optical modulator which generates an optical signal modulated in accordance with a data signal to send out said optical signal to a transmission path, comprising:

detecting a "010" pattern in said data signal, and also generating a delay data signal in which said data signal is delayed by 2 bits;

generating a pulse width reducing data signal, in which the pulse width of a "1" signal in a second bit of the "010" pattern in said delay data signal is reduced to be narrower than the pulse width of other bits, according to the pattern detection result; and driving said optical modulator in accordance with said pulse width reducing data signal, to send out an optical signal to be waveform-compressed in the transmission path, to the transmission path.

3. A driving method of an optical modulator which generates an optical signal modulated in accordance with a data signal to send out said optical signal to a transmission path, comprising:

detecting a "010" pattern in said data signal, and also generating a delay data signal in which said data signal is delayed by 2 bits;

expanding a pulse width of all the "1" signals in said delay data signal by a previously set length, and then generating a pulse width reducing data signal, in which the pulse width of a "1" signal in a second bit of the "010" pattern in said delay data signal for which the pulse width is expanded, is reduced to be narrower than the pulse width of other bits, according to the pattern detection result; and driving the optical modulator in accordance with the pulse width reducing data signal, to send out an optical signal to be waveform-compressed in the transmission path, to the transmission path.

4. An optical transmitter comprising an optical modulator which generates an optical signal modulated in accordance with a data signal to send out said optical signal to a transmission path, and a driving apparatus therefor, wherein said driving apparatus comprises:

a pattern detection circuit which detects a "011" pattern and a "110" pattern in said data signal;

a 2-bit delay circuit which delays said data signal by 2 bits;

a pulse width expansion circuit which expands the pulse width of a "1" signal in a second bit of the "011" pattern and the pulse width of a "1" signal in a second bit of the "110" pattern in said data signal which is delayed by said 2-bit delay circuit, to be wider than the pulse width of other bits, according to the pattern detection result in said pattern detection circuit; and a driving circuit which generates a driving signal for driving said optical modulator, in accordance with the data signal in which the pulse width thereof is expanded by said pulse width expansion circuit, and said optical modulator performs a modulation operation based on the driving signal from said driving circuit, to send out an optical signal to be waveform-compressed in the transmission path, to the transmission path.

5. An optical transmitter according to claim 4,
wherein when wavelength dispersion of the transmission path is positive with respect to a wavelength of the optical signal sent out from said optical modulator,
said optical modulator sends out a pre-chirped optical signal having a negative α parameter to the transmission path.

6. An optical transmitter according to claim 4,
wherein when wavelength dispersion of the transmission path is negative with respect to a wavelength of the optical signal sent out from said optical modulator,
said optical modulator sends out a pre-chirped optical signal having a positive α parameter to the transmission path.

7. An optical transmitter according to claim 4,
wherein when wavelength dispersion of the transmission path is positive with respect to a wavelength of the optical signal sent out from said optical modulator,
there is provided an optical amplifier which amplifies the power of the optical signal sent out from said optical modulator up to a level at which a nonlinear effect occurs in the transmission path.

8. An optical transmitter according to claim 4,
wherein said pulse width expansion circuit can change an expansion amount of the pulse width.

9. An optical transmitter according to claim 4,
wherein a 3-bit shift register circuit is provided instead of said 2-bit delay circuit,
said pattern detection circuit detects patterns by utilizing data of each bit latched by said 3-bit shift register circuit, and
said pulse width expansion circuit expands the pulse width of a data signal having passed through said 3-bit shift register circuit.

10. An optical transmitter according to claim 4,
wherein two 3-bit shift register circuits to which a pair of data signals each having a bit rate of half the bit rate of the optical signal sent out from said optical modulator are respectively input, and a selector circuit which combines the data signals having passed through said respective 3-bit shift register circuits, are provided instead of said 2-bit delay circuit,
said 3-bit shift register circuits and said selector circuit operate in synchronism with a clock signal of a frequency corresponding to said half the bit rate,
said pattern detection circuit detects patterns by utilizing data of the first bit and the second bit latched by said respective 3-bit shift register circuits, and
said pulse width expansion circuit expands the pulse width of a data signal combined by said selector circuit.

11. An optical transmission system comprising an optical transmitter recited in claim 4 and an optical receiver,
wherein said optical receiver includes an input power monitor which measures the power of a received optical signal, and
said optical transmitter can change an expansion amount of the pulse width in said pulse width expansion circuit, and controls said expansion amount of the pulse width, according to the length of the transmission path judged based on the measurement result by said input power monitor.

12. An optical transmission system comprising an optical transmitter recited in claim 4 and an optical receiver,
wherein said optical transmitter and receiver each includes a peaking circuit having a gain-frequency characteristic in which a peak exists in the vicinity of a frequency band corresponding to the bit rate of the optical signal to be sent out from said optical transmitter to the transmission path, and amplifies a received signal using said peaking circuit.

13. An optical transmitter comprising an optical modulator which generates an optical signal modulated in accordance with a data signal to send out said optical signal to a transmission path, and a driving apparatus therefor,
wherein said driving apparatus comprises:
a pattern detection circuit which detects a "010" pattern in said data signal;
a 2-bit delay circuit which delays said data signal by 2 bits;
a pulse width reduction circuit which reduces the pulse width of a "1" signal in a second bit of the "010" pattern in said data signal which is delayed by said 2-bit delay circuit, to be narrower than the pulse width of other bits, according to the pattern detection result in said pattern detection circuit; and
a driving circuit which generates a driving signal for driving said optical modulator, in accordance with the data signal in which the pulse width thereof is reduced by said pulse width reduction circuit, and
said optical modulator performs a modulation operation based on the driving signal from said driving circuit, to send out an optical signal to be waveform-compressed in the transmission path, to the transmission path.

14. An optical transmitter comprising an optical modulator which generates an optical signal modulated in accordance with a data signal to send out said optical signal to a transmission path, and a driving apparatus therefor,
wherein said driving apparatus comprises:
a pattern detection circuit which detects a "010" pattern in said data signal;
a 2-bit delay circuit which delays said data signal by 2 bits;
a pulse width expansion circuit which expands the pulse width of all the "1" signals in a data signal which has been delayed by said 2-bit delay circuit, by a previously set length;
a pulse width reduction circuit which reduces the pulse width of a "1" signal in a second bit of the "010" pattern in the data signal output from said pulse width expansion circuit, to be narrower than the pulse width of other bits, according to the pattern detection result in said pattern detection circuit; and
a driving circuit which generates a driving signal for driving said optical modulator, in accordance with the data signal in which the pulse width thereof is reduced by said pulse width reduction circuit, and
said optical modulator performs a modulation operation based on the driving signal from said driving circuit, to send out an optical signal to be waveform-compressed in the transmission path, to the transmission path.

15. An optical transmitter according to claim 14, wherein when wavelength dispersion of the transmission path is positive with respect to a wavelength of the optical signal sent out from said optical modulator, said optical modulator sends out a pre-chirped optical signal having a negative α parameter to the transmission path.

16. An optical transmitter according to claim 14, wherein when wavelength dispersion of the transmission path is negative with respect to a wavelength of the optical signal sent out from said optical modulator, said optical modulator sends out a pre-chirped optical signal having a positive α parameter to the transmission path.

17. An optical transmitter according to claim 14, wherein when wavelength dispersion of the transmission path is positive with respect to a wavelength of the optical signal sent out from said optical modulator, there is provided an optical amplifier which amplifies the power of the optical signal sent out from said optical modulator up to a level at which a nonlinear effect occurs in the transmission path.

18. An optical transmitter according to claim 14, wherein said pulse width reduction circuit can change a reduction amount of the pulse width.

19. An optical transmitter according to claim 14, wherein said driving circuit has a function of controlling the output amplitude of the drive signal for driving said optical modulator, in accordance with the pattern detection result of said pattern detection circuit.

20. An optical transmitter according to claim 14, wherein a 3-bit shift register circuit is provided instead of said 2-bit delay circuit, said pattern detection circuit detects patterns by utilizing data of each bit latched by said 3-bit shift register circuit, and said pulse width reduction circuit reduces the pulse width of a data signal having passed through said 3-bit shift register circuit and said pulse width expansion circuit.

21. An optical transmitter according to claim 14, wherein two 3-bit shift register circuits to which a pair of data signals each having a bit rate of half the bit rate of the optical signal sent out from said optical modulator are respectively input, and a selector circuit which combines the data signals having passed through said respective 3-bit shift register circuits, are provided instead of said 2-bit delay circuit, said 3-bit shift register circuits and said selector circuit operate in synchronism with a clock signal of a frequency corresponding to said half the bit rate, said pattern detection circuit detects patterns by utilizing data of the first bit and the second bit latched by said respective 3-bit shift register circuits, and said pulse width reduction circuit reduces the pulse width of a data signal combined by said selector circuit and then passed through said pulse width expansion circuit.

22. An optical transmission system comprising an optical transmitter recited in claim 14 and an optical receiver, wherein said optical receiver includes an input power monitor which measures the power of a received optical signal, and said optical transmitter can change a reduction amount of the pulse width in said pulse width reduction circuit, and controls said reduction amount of the pulse width, according to the length of the transmission path judged based on the measurement result by said input power monitor.

23. An optical transmission system comprising the optical transmitter recited in claim 14 and an optical receiver, wherein said optical transmitter and receiver each includes a peaking circuit having a gain-frequency characteristic in which a peak exists in the vicinity of a frequency band corresponding to the bit rate of the optical signal to be sent out from said optical transmitter to the transmission path, and amplifies a received signal using said peaking circuit.

* * * * *